Patented June 23, 1953

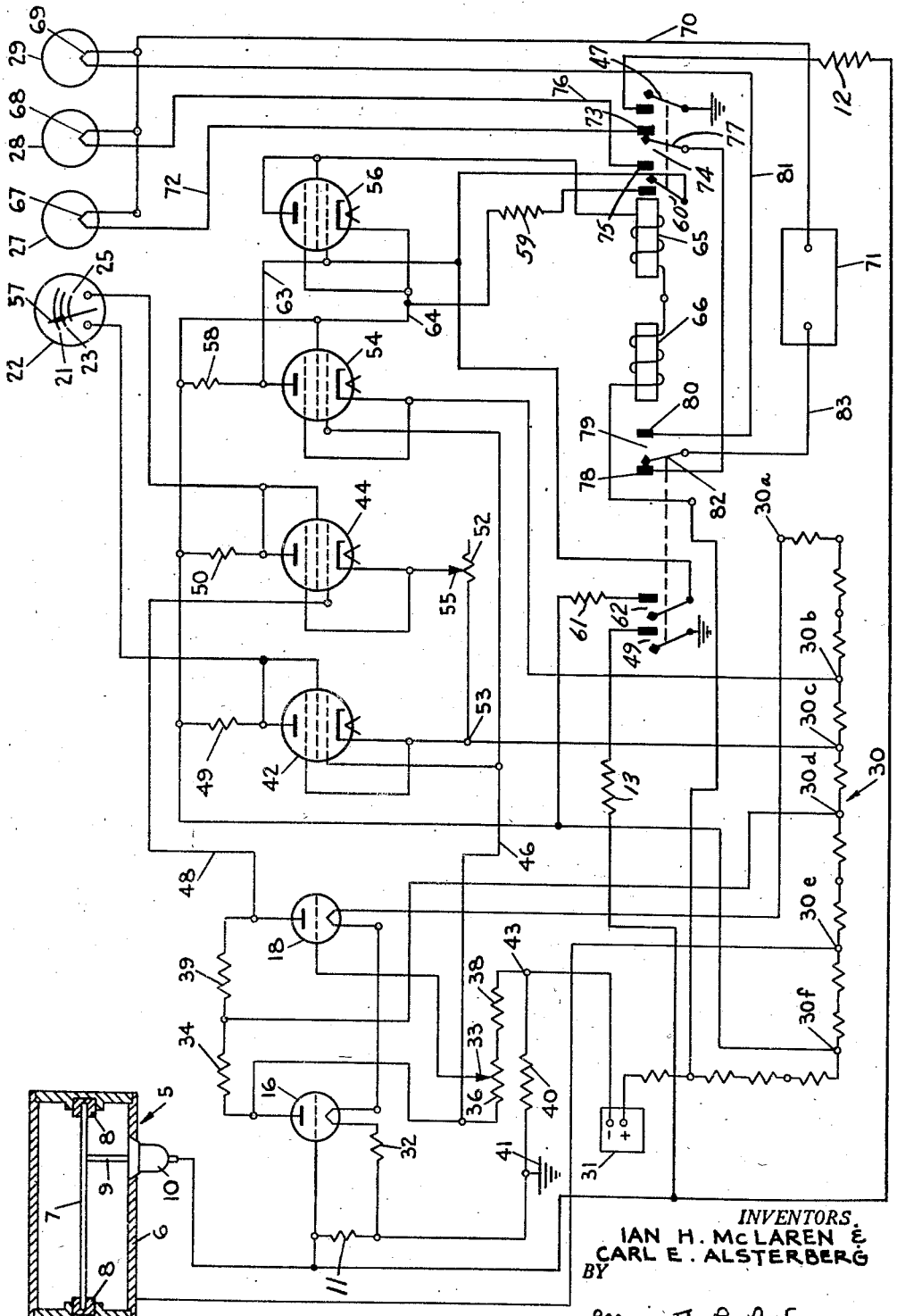

2,643,344

UNITED STATES PATENT OFFICE 2,643,344

SYSTEM FOR MEASURING RADIOACTIVITY

Ian H. McLaren, Dearborn, and Carl E. Alsterberg, Detroit, Mich., assignors to Bendix Aviation Corporation, Detroit, Mich., a corporation of Delaware Application January 10, 1950, Serial No. 138,769

15 Claims. (Cl. 250—83.6)

This invention relates to an electrical measuring system, and more particularly, to a system for electrically measuring the radioactivity in a particular locality. The system is especially adapted to measure an extremely wide range of radioactivity and to give an instantaneous visual indication of the intensity of radioactivity present.

With the harnessing of atomic energy and its actual and potential applications for peace and war, it has become extremely important to obtain a system which will accurately measure the intensity of radioactivity present in a particular locality.

The systems that have been developed operate on the principle of converting the radioactive emanations into a measurable electrical current. For this purpose a Geiger counter is normally used. The electrical current developed by the Geiger counter is amplified and measured by a meter calibrated in terms of units of radioactivity.

Such systems have been unsatisfactory for a number of reasons. For example, it has been found that the range within which the Geiger counter can operate properly is not sufficiently broad to cover radiations which can be reasonably expected under certain conditions, such as may result from an atomic bomb. Furthermore, it has been found that the electrical circuits per se do not permit an accurate measurement over the wide ranges of radioactivity that may be encountered. The problem of providing a suitable measuring system has been complicated by the limited space normally available in ships, airplanes and other places where radioactive measurements are normally made.

An object of this invention is to provide an electrical system for accurately measuring the radioactivity in a particular locality and especially over the wide ranges which may be encountered therein.

Another object is to provide an electrical system of the above indicated character which is simple, compact, efficient and reliable.

A further object is to provide a system for instantaneously indicating the general level of radioactivity present in a given locality so that the danger from the radiations may be quickly ascertained.

Still another object is to provide a system having a switching arrangement for coordinating the activities of a plurality of meter scales with a plurality of visual aids which instantaneously indicate the scale to be read.

A still further object is to provide a system having an ionization chamber which will operate satisfactorily over a relatively unlimited range of radioactivity.

Other objects and advantages of the invention will be apparent from a detailed description of the invention and from the appended drawings and claims.

The drawing is a schematic diagram of electrical and mechanical components embodying the invention.

In one embodiment of the invention, an ionization chamber, generally indicated at 5, has a conductive cylinder 6, which serves as a positive electrode, and a rod 7 axially disposed therein, which serves as a negative electrode. The ionization chamber operates in the presence of radioactive emanations to produce electrons and positive ions and to collect the electrons and ions so as to produce a current through a grid leak resistance 11.

The current through resistance 11 varies the bias upon a tube 16 and, as a result, produces an unbalance between the voltage on the tube and the voltage on a second tube 18. This differential in voltage is amplified by an amplifier circuit which includes tubes 42 and 44 and is thereafter applied to an indicator 22, having a plurality of distinctively colored scales 21, 23, and 25. The voltage is also applied to an automatic range-changing circuit, which includes tubes 54 and 56. The automatic range-changing circuit acts on a switching circuit to illuminate one of a plurality of light sources or bulbs 27, 28, and 29. Each bulb has a color corresponding to the color of one of the scales 21, 23, and 25, so as to provide an instantaneous visual indication of the scale being used.

Ionization chamber

Specifically, positive terminal 6 may be a cylinder made from brass approximately $\frac{3}{32}$" thick and having a diameter of approximately $2\frac{3}{4}$" and a length of approximately $6\frac{1}{4}$". The cylinder is filled with argon gas at a pressure of 42 pounds and is sealed to prevent the argon from escaping. The negative terminal 7 may be a brass rod extending axially through the cylinder 6 and fastened by insulators 8 to opposite heads of the cylinder. A wire 9 is connected to rod 7 at one end and extends through the walls of cylinder 6 at the other end. The wire 9 is insulated from cylinder 6 by a glass bushing 10.

The cylinder 6 has a voltage of approximately 75 to 100 direct volts imposed on it from a tap 30e on a voltage divider network generally indicated at 30, the voltage being obtained from a power supply 31. The rod 7 is connected to ground through the grid leak resistance 11, which has a very high value so that it may develop a sufficient voltage when the current flows through the ionization chamber 5. A return path for the current flow is provided through the voltage divider network 30.

The gamma photons constituting the radioactive emanations penetrate the walls of the ionization chamber 5 from the area surrounding the chamber and impart energy to the molecules of the chamber, causing electrons to break away from the inner wall. These electrons are attracted back to the cylinder 6 and thus produce no resultant electrical current. Some of the electrons, however, strike molecules of argon gas during their flight and cause these molecules to be split into electrons and positive ions. The electrons are attracted toward terminal 6 and the ions toward terminal 7, producing a current from the voltage divider network 30 through the ionization chamber 5 and resistance 11 and back through the network. This current is very small but produces a voltage drop of approximately 0.2 volt across the resistance 11 because of the high value of the resistance. This voltage is applied to the grid of the tube 16 to vary the output of the tube.

Detector

The detector circuit includes tubes 16 and 18. The tube 16 is a triode having its cathode connected through a resistance 32 to the ground side of resistance 11 and its grid connected to the other side of resistance 11. The plate of the tube 16 is connected through a resistance 34 to a tap 30d on the voltage divider network 30. A resistance network comprising a potentiometer 36 and resistances 38 and 40 is provided in series with the plate of the tube 16. Resistance 40 is grounded at terminal 41 and is connected at terminal 43 to the negative terminal of the battery 31. A resistance 12 and a normally open switch 47 are connected in series between the grid of the tube 16 and the grounded terminal 41. Likewise, a resistance 13 and a normally open switch 49 are connected in series between the grid and ground. Resistance 12 has a value somewhat less than that of resistance 11 and resistance 13 has an even lower value. Resistances 12 and 13 act to lower the sensitivity of the detector so that the different scales of the indicator 22 may be used, as will be further described hereinafter.

The tube 18, which is also a triode, has its grid connected to an adjustable tap 33 of the potentiometer 36. One side of the cathode is connected to the cathode of tube 16, while the other side of the cathode is connected to a low voltage terminal 30a of voltage divider network 30. The plate of the tube 18 is connected to the tap 30d of the network 30 through a resistance 39, which is equal to resistance 34.

To operate the detector, the position of the potentiometer tap 33 is manually adjusted so that equal plate currents flow through the tubes 16 and 18 when no radioactivity is present. When current flows through resistance 11 as a result of radioactive emanations, a voltage is produced across it which increases the voltage on the grid of the tube 16. This causes the current through the tube 16 to increase and the voltage on its plate to decreased. The drop in plate voltage results in a decrease in voltage across potentiometer 36 and accordingly a decrease in voltage on the grid of the tube 18. The current through the tube 18 falls and the voltage on its plate rises. As a result, a voltage difference is produced between the plates of the tubes 16 and 18 which is proportionate to the amount of radioactivity present. This voltage difference is applied to the tubes 42 and 44 for amplification.

Amplifier

The tubes 42 and 44 are pentodes and have their grids connected by leads 46 and 48 to the plates of the tubes 16 and 18, respectively. The suppressor grid of each tube is connected to the cathode of the tube, and the plate of each tube is connected to the screen grid of the tube. The plates of the tubes 42 and 44 are also connected through matched resistances 49 and 50 to a tap 30f on the resistance network 30. The cathode of the tube 42 is connected at terminal 53 to a rheostat 52 and to a tap 30c on the voltage divider network 30. The cathode of the tube 44 is connected to adjustable tap 55 of rheostat 52.

Tap 55 is adjusted so that equal currents flow through tubes 42 and 44 when no radioactivity is present. As previously explained, the radioactive emanations cause the voltage on the plate of the tube 16 to decrease and the voltage on the plate of the tube 18 to increase. Since these voltages are applied to the grids of the tubes 42 and 44, respectively, the current through the tube 42 decreases and the current through the tube 44 increases, and the voltages on the plates of the tubes 42 and 44 rise and fall, respectively. The voltage differential between the tubes 16 and 18 is accordingly amplified by the tubes 42 and 44 and this voltage differential is applied to the indicator 22.

Indicator

The indicator 22 is of a conventional type and has a pointer 57 which is magnetically actuated by the current flowing through the indicator. The indicator has three scales. Scale 21 may have a range of 0–0.1 roentgen per 24-hour day, scale 23 a range of 0–0.5 roentgen per 24-hour day, and scale 25 a range of 0–50 roentgens per 24-hour day. Each scale has a different color so that it may be easily distinguished from the other scales. Thus, scales 21, 23 and 25 have white, yellow and red colors, respectively. The different scales are used when the switches 47 and 49 are closed by the automatic range changing circuit and the switching arrangement hereinafter to be described.

Automatic range changing circuit

The automatic range changing circuit includes two pentodes 54 and 56 connected to each other in cascade arrangement. The grid of the pentode 54 is connected to the plate of the tube 16, and the suppressor grid and the screen grid are connected to the cathode and plate, respectively. The cathode of the tube 54 has a low voltage impressed on it from a tap 30b on the resistance network 30, while the plate has a greater voltage impressed on it through a resistance 58 connected to tap 30f on the resistance network. A resistance 59 and a normally open switch 60 are in series with each other across resistance 58 and a similar arrangement is provided for a resistance 61 and a normally open switch 62.

A lead 63 runs from the plate of the tube 54 to the grid of the tube 56 and a lead 64 runs to the cathode of the tube 56 from the common terminal between the resistance 58 and the tap 30f. The cathode of the tube 56 is connected to the suppressor grid of the tube and the screen grid is connected to the plate. A pair of solenoids 65 and 66 are provided in series with the plate.

Since the grid of the tube 54 is connected to the plate of the tube 16, it suffers a decrease in voltage when radioactivity is present, the voltage drop varying in accordance with the amount of radioactivity. As a result, the current flowing through the tube 54 decreases, and the plate voltage rises, causing a decrease in the voltage across resistance 58. Since this voltage is applied between the cathode and grid of tube 56, the current flowing through the tube 56 increases. When the current reaches a predetermined value, the solenoid 65 is actuated and closes the switch 47 in the detector so that the resistance 12 is placed in parallel with the resistance 11. As a result, the sensitivity of the detector circuit is sufficiently dulled so that the indicator 22 measures from 0-0.5 roentgen on scale 23. Likewise, the solenoid 66 is operated at a predetermined current to close switch 49 and permit the indicator 22 to measure from 0-50 roentgens on scale 25. The current required to actuate the solenoid 66 is greater than the current required to actuate the solenoid 65. Therefore, the solenoid 65 is actuated first and remains actuated when the current becomes strong enough to operate the solenoid 66.

*Switching arrangement*

The switching arrangement includes a plurality of switches so arranged that a particular bulb is illuminated to indicate the scale which should be read. The bulbs 27, 28, and 29 have filaments 67, 68, and 69, respectively, and one side of each filament is connected by a lead 70 to an alternating current power source 71. The filament 67 is also connected by a lead 72 to a stationary contact 73 on a double-throw switch 74. The other stationary contact 75 of switch 74 is connected by a lead 76 to filament 68 of bulb 28 and the movable contact 77 is connected to a stationary contact 78 of a double-throw switch 79. The other stationary contact 80 of the switch 79 is connected by a lead 81 to the filament 69 of the bulb 29. The movable contact 82 is connected by a lead 83 to the power source 71.

Each of the bulbs 27, 28, and 29 illuminates the indicator face with a distinctive color which corresponds to the color of one of the indicator scales. Thus, bulb 27 emits a white color, bulb 28 a yellow color and bulb 29 a red color. The apparatus for directing the illumination from each of the bulbs upon the face of the indicator 22 is disclosed in co-pending application of Fred N. Blackmore and Donald F. Clinton, filed December 29, 1949, Serial No. 138,061.

When the current flowing through the solenoids 65 and 66 is not strong enough to actuate either solenoid, the movable contacts 77 and 82 rest against the contacts 73 and 78, respectively. As a result, a continuous circuit is established from the power source 71 through lead 70, filament 67, lead 72, contacts 73 and 77 of switch 74, contacts 78 and 82 of switch 79 and lead 83 back to the power source. Bulb 27 is energized and illuminates the indicator with a white light indicating that the white scale 21 is to be read. When the radioactive emanations approach 0.1 roentgen per 24-hour day, the current becomes strong enough to actuate the solenoid 65, which attracts the movable contact 77 to the stationary contact 75. This opens the closed path to the filament 67 and causes the filament 68 to be energized through a circuit which includes the power source 71, lead 70, filament 68, lead 76, contacts 75 and 77 of switch 74, contacts 78 and 82 of switch 79, and lead 83. The yellow illumination from the bulb 28 signifies that scale 23, which measures 0-0.5 roentgen per 24-hour day, is to be read.

At the same time, the solenoid 65 closes the switch 47 and places the resistance 12 in parallel with the resistance 11. This dulls the sensitivity of response of the tubes 16 and 18 and permits the indicator 22 to measure the wider range of values represented by the scale 23. The solenoid 65 also operates the switch 60 to increase the sensitivity with which the tube 56 responds. This provides a compensation in the automatic range-change circuit for the lowered response which results when the resistance 12 is placed in parallel with the resistance 11. The current flowing through the solenoid, therefore, remains constant when the indicator is switched from scale 21 to scale 23 and the solenoid continues to be actuated.

The solenoid 66 is actuated by a current which is slightly greater than the current required to actuate the solenoid 65 and which corresponds to a radioactivity of 0.5 roentgen. When the solenoid 66 is actuated, the movable contact 82 shifts from the stationary contact 78 to the contact 80 and breaks the continuous circuit through the bulb 28. At the same time, the bulb 29 is illuminated through a circuit which comprises the power source 71, lead 70, filament 69, lead 81, contacts 80 and 82 of switch 79, and lead 83. The resultant red color on the face of the indicator 22 indicates that scale 25 is to be read. The indicator is prepared for the increased range of the scale 25 by the closing of the switch 49, which places the resistance 13 in parallel with the resistances 11 and 12. The switch 62 also closes when the solenoid 66 is actuated and provides a holding switch for maintaining the actuation of the solenoid, in a manner similar to switch 60.

*Summary*

Radioactive emanations, such as gamma photons, penetrate the ionization chamber 5 and cause argon gas molecules to split up into electrons and positive ions. The electrons are attracted to the positive terminal 6 and the ions to the negative terminal 7. The resultant current produces a voltage across resistance 11 which increases the voltage on the grid of the tube 16 in proportion to the amount of radioactivity present. This causes the current through the tube 16 to increase and its plate voltage to decrease. Since the grid of the tube 18 is connected to the plate of the tube 16, the current through the tube 18 decreases and its plate voltage increases. The resultant voltage difference is amplified by the tubes 42 and 44 and applied to the indicator 22.

The current through the tube 16 is also amplified by the tubes 54 and 56 and applied to the solenoids 65 and 66 in series. At a current corresponding to a radioactivity of 0.1 roentgen per 24-hour day, the solenoid 65 is actuated and operates switches which bring about the illumination of the bulb 28 to indicate that the indicator scale 23 should be read. The solenoid also operates the switch 47 so that the maximum range of the indicator 22 will be increased from 0.1 roentgen per 24-hour day to 0.5 roentgen per 24- hour day. To compensate for the reduced currents which result when the resistance 12 is placed in parallel with resistance 11, the switch 60 is closed to maintain the solenoid 65 actuated.

In like manner, at a current corresponding to 0.5 roentgen per 24-hour day, the indicator scale 25 is switched into the circuit by the actuation of the solenoid 66, thereby permitting measurements to be taken from 0–50 roentgens.

It should be realized that the above system can be easily adapted to measure more than three overlapping ranges and that light bulbs having distinctive colors corresponding to the colors of these additional ranges can be easily added to the system.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. An apparatus for measuring the intensity of radioactivity, including, an ionization chamber adapted to produce an electrical current proportional to the intensity of the radioactivity, a normally balanced detector circuit connected to the ionization chamber and operative to produce a differential of balance in proportion to the electrical current, means for indicating the differential of balance, the indicating means having scales each adapted to indicate a definite range of radioactivity, and means automatically operative at predetermined differentials of balance to provide visual indication of the relative intensity of the radioactivity.

2. An apparatus for measuring the intensity of radioactivity, including, an ionization chamber adapted to produce an electrical current proportional to the intensity of the radioactivity, a detector having a pair of tubes acting in balanced opposition to each other for a condition of no radioactivity and operative to develop a voltage differential proportional to the electrical current, means for indicating the voltage differential between the tubes, the indicating means having distinctively colored scales each adapted to indicate a definite range of values, light sources having colors corresponding to the colors of the scales, and means for illuminating one of the light sources in accordance with the scale to be read.

3. An apparatus for measuring the intensity of radio activity, including, an ionization chamber adapted to produce an electrical current proportional to the intensity of the radioactivity, a variable impedance connected to the ionization chamber to provide a voltage proportional to the electrical current through the chamber, a pair of tubes adapted to produce similar outputs for a condition of no radioactivity and to provide an output differential proportional to the voltage across the impedance, an indicator having scales each adapted to provide a visual indication of the intensity of the radioactivity, and means for varying the value of the impedance in accordance with the indicator scale to be read.

4. An apparatus for measuring the intensity of radioactivity, including, means for generating an electrical current proportional to the intensity of the radioactivity, means for amplifying the electrical current, an electrical indicator having scales each adapted to indicate a progressively wider range of current, and means for adjusting the sensitivity of the generating means in inverse proportion to the range of the scale to be read.

5. An apparatus for measuring the intensity of radioactivity, including, an ionization chamber adapted to produce an electrical current proportional to the intensity of the radioactivity, a variable impedance connected to the ionization chamber to provide a voltage proportional to the electrical current through the chamber, a pair of tubes adapted to produce similar outputs for a condition of no radioactivity and to provide an output differential proportional to the voltage across the impedance, an indicator having distinctively colored scales, each adapted to provide a visual indication of the intensity of the radioactivity, means for varying the value of the impedance in accordance with the indicator scale to be read, a light source associated with each scale and adapted to provide a light having a color corresponding to the associated scale, and means for operating a particular light source to provide an illumination having a color corresponding to the color of the scale to be read.

6. Apparatus for measuring the intensity of radioactivity, including, an ionization chamber adapted to produce an electrical current proportional to the intensity of radioactivity, a detector having a pair of tubes acting in balanced opposition to each other for a condition of no radioactivity and operative to develop a voltage differential proportional to the electrical current, means instantaneously operative for any changes in the differential of voltage to provide an indication of the relative intensity of radioactivity, and a switching circuit operative at predetermined values of the voltage differential to adjust the sensitivity of the indicator.

7. Apparatus for measuring the intensity of radioactivity, including, an ionization chamber adapted to produce an electrical current proportional to the intensity of the radioactivity, a normally balanced detector circuit connected to the ionization chamber and operative to produce a differential of balance in proportion to the electrical current, means for indicating the differential of balance, the indicating means having scales each adapted to indicate a predetermined range, and means operative for a differential of balance at the end of each range to adjust the sensitivity of the detector in accordance with the scale having the next highest range.

8. Apparatus for measuring the intensity of radioactivity, including, means for producing an electrical current proportional to the intensity of the radioactivity, an indicator having a plurality of scales of varying range, a switching circuit operative at predetermined values of the electrical current to adjust the sensitivity of the current-producing means in accordance with the scale to be read, and means associated with the indicator and operative by the switching circuit to provide an instantaneous indication of the scale to be read.

9. Apparatus for measuring the intensity of radioactivity, including, means for producing an electrical current proportional to the intensity of the radioactivity, an indicator having a plurality of scales of progressively increasing range, a switching circuit operative for a predetermined current at the end of each range to reduce the sensitivity of the current-producing means in accordance with the increase in the range of the succeeding scale, means operative by the switching circuit to increase the sensitivity of the switching circuit in accordance with the reduction in the sensitivity of the current-producing means, and means associated with the indicator and operative by the switching circuit to provide an instantaneous indication of the scale to be read.

10. Apparatus for measuring the intensity of radioactivity, including, means for producing an electrical current proportional to the intensity of the radioactivity, an indicator connected to the current-producing means and having a plurality of scales adapted to cover different ranges of radioactivity, a plurality of solenoids, each solenoid being connected to the current-producing means and operative by a maximum current in one indicator range to reduce the sensitivity of the current-producing means in accordance with the ratio between this range and the next highest range, and means operative by each solenoid to provide an instantaneous indication of the scale to be read.

11. Apparatus for measuring the intensity of radioactivity, including, an ionization chamber adapted to produce an electrical current proportional to the intensity of radioactivity, a relatively high impedance connected to the ionization chamber, a first tube having a cathode, a grid and plate, the grid and cathode of the first tube being connected across the impedance, a second tube having a cathode, grid and plate, the grid of the second tube being connected to the plate of the first tube, the cathode of the second tube being connected to the cathode of the first tube, an indicator connected across the plates of the two tubes to provide an indication of the intensity of radioactivity, and a switching circuit associated with the indicator to adjust the sensitivity of the indicator for predetermined values of the intensity of radioactivity.

12. Apparatus for measuring the intensity of radioactivity, including, an ionization chamber adapted to produce an electrical current proportional to the intensity of radioactivity, a relatively high impedance connected to the ionization chamber, a first tube having a cathode, grid and plate, the grid and cathode of the first tube being connected across the impedance, a second tube having a cathode, grid and plate, the grid of the second tube being connected to the plate of the first tube, the cathode of the second tube being connected to the cathode of the first tube, a variable impedance connected between the grid of one tube and the plate of the other tube to balance the current through the two tubes for a condition of no radioactivity, and an indicator connected across the plates of the two tubes to provide an indication of the intensity of radioactivity.

13. Apparatus for measuring the intensity of radioactivity, including, an ionization chamber adapted to produce an electrical current proportional to the intensity of radioactivity, a first resistance of relatively high value connected to the ionization chamber, a plurality of resistances of progressively decreasing value compared to the first resistance, a normally open switch connected to each resistance in the plurality to provide a series circuit with its associated resistance across the first resistance, a first tube having a cathode, grid and plate, the grid and cathode being connected across the first resistance, a second tube having a cathode, grid and plate, the grid of the second tube being connected to the plate of the first tube, the cathode of the second tube being connected to the cathode of the first tube, an indicator connected to the plates of the two tubes to measure the difference in voltages on the tube plates, a plurality of scales on the indicator, each scale having a different range, and means operative at predetermined differences of voltage to close one of the switches so as to dull the sensitivity of reaction of the tubes and increase the range of the indicator.

14. Apparatus for measuring the intensity of radioactivity, including, an ionization chamber operative to produce an electrical current proportional to the intensity of radioactivity, a first resistance of relatively high value connected to the ionization chamber, a plurality of resistances of progressively decreasing value, a switch associated with each resistance in the plurality, each resistance in the plurality and its associated switch being connected across the first resistance, a detector circuit connected to the resistances, the detector being normally balanced for a condition of no radioactivity and becoming unbalanced in proportion to the electrical current through the ionization chamber, an indicator connected to the detector and having a plurality of scales for measuring different ranges of detector unbalance, and a plurality of solenoids controlling the operation of the switches, each solenoid being operative upon a particular switch for a predetermined current through the ionization chamber to reduce the sensitivity of response of the detector and thereby increase the range of response of the indicator.

15. Apparatus for measuring the intensity of radioactivity, including, an ionization chamber operative to produce an electrical current proportional to the intensity of radioactivity, a first resistance of relatively high value connected to the ionization chamber, a plurality of resistances of progressively decreasing value, a switch associated with each resistance in the plurality, each resistance in the plurality and its associated switch being connected across the first resistance, a detector circuit connected to the resistances, the detector being normally balanced for a condition of no radioactivity and becoming unbalanced in proportion to the electrical current through the ionization chamber, an indicator connected to the detector and having a plurality of scales for measuring different ranges of detector unbalance, a plurality of solenoids controlling the operation of the switches, each solenoid being operative upon a particular switch for a predetermined voltage across the resistances to reduce the sensitivity of response of the detector and thereby increase the range of response of the indicator, and means operative by the solenoids to increase the sensitivity of response of the solenoids as compensation for a reduction in the sensitivity of response of the detector.

IAN H. McLAREN.
CARL E. ALSTERBERG.

References Cited in the file of this patent

UNITED STATES PATENTS

| Number | Name | Date |
| --- | --- | --- |
| 2,326,878 | Muller | Aug. 17, 1943 |
| 2,428,806 | Liben et al. | Oct. 14, 1947 |
| 2,434,297 | Test et al. | Jan. 13, 1948 |
| 2,457,289 | Warnick | Dec. 28, 1948 |
| 2,465,938 | Shonka | Mar. 29, 1949 |
| 2,499,953 | Herzog | Mar. 7, 1950 |